Feb. 12, 1946. W. C. WEBER 2,394,956
MACHINE FEEDING MECHANISM
Filed Feb. 2, 1945  3 Sheets-Sheet 1
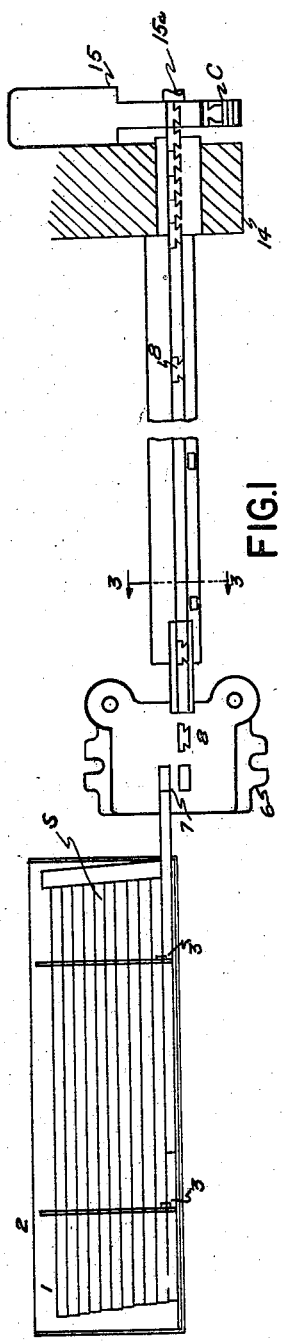
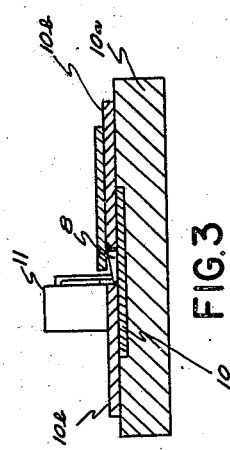
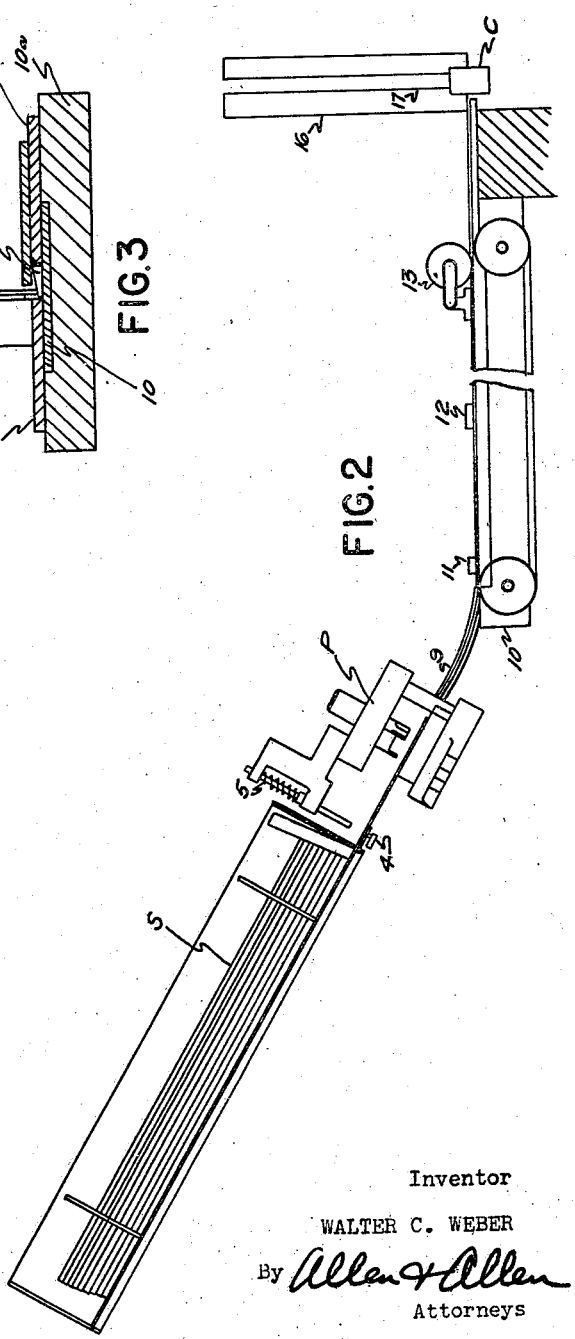
Inventor
WALTER C. WEBER
By Allen & Allen
Attorneys Feb. 12, 1946.  W. C. WEBER  2,394,956
MACHINE FEEDING MECHANISM
Filed Feb. 2, 1945  3 Sheets-Sheet 2

Inventor
WALTER C. WEBER
By *Allen & Allen*
Attorneys

Feb. 12, 1946. W. C. WEBER 2,394,956
MACHINE FEEDING MECHANISM
Filed Feb. 2, 1945 3 Sheets-Sheet 3
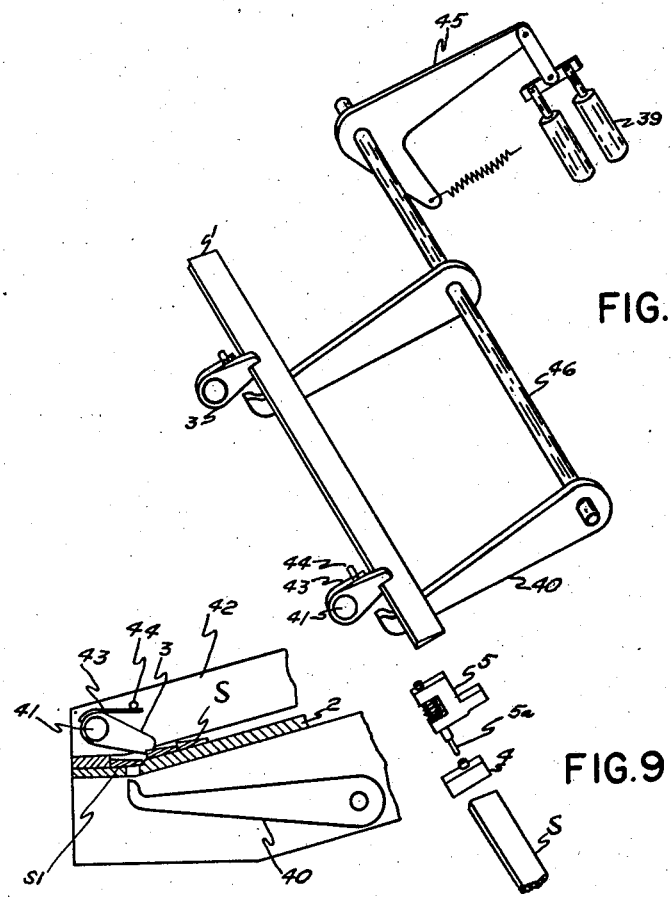
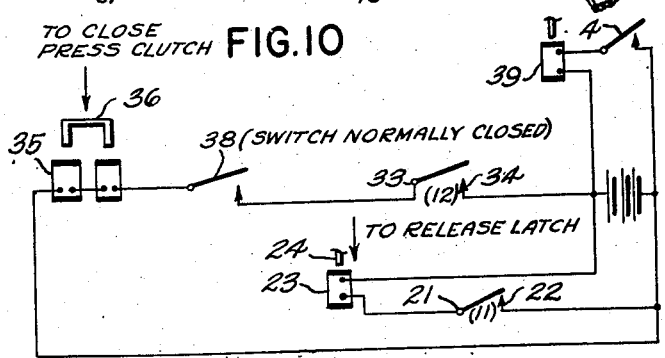
Inventor
WALTER C. WEBER
By Allen & Allen
Attorneys Patented Feb. 12, 1946

2,394,956

UNITED STATES PATENT OFFICE 2,394,956

MACHINE FEEDING MECHANISM

Walter C. Weber, Dayton, Ohio, assignor to Dayton Precision Manufacturing Company, a corporation of Delaware Application February 2, 1945, Serial No. 575,853

5 Claims. (Cl. 164—116)

My invention relates to mechanism whereby pieces formed in a die press may be delivered to a machine which utilizes the pieces, whereby the press is provided with material and is operated sufficiently to keep the machine supplied with a succession of the pieces subject to automatic control.

The particular embodiment of my invention relates to the supply of segments of commutators to an assembling device which sets them up in ring form. The segments or commutator bars are died out of strip stock of correct cross section and delivered one at a time to a conveyor. The conveyor delivers them to a device which ejects the segments one at a time. The ejecting mechanism stops operating after each complete commutator is formed.

When the commutator is formed the operator removes it from the apparatus and at his option starts up the ejecting mechanism again when ready to set up another commutator. Under such circumstances the problem of keeping up a supply of simultaneously formed segments for the ejecting mechanism presents difficulties, because the coupling up mechanically of the ejecting mechanism, the conveyor and the press would be a considerable problem.

I illustrate my invention by reference to such an arrangement of machines, but it is obvious that the same concept has application for other arrangements. The objective is to operate the press only so long as it maintains a supply of segments for the assembling machine, to stop the press when sufficient supply has built up and to start the press up again when the supply is beginning to run short. Incidentally an objective is to supply the press with strip stock so that it does not run out of material. The operator needs but to replenish the strip stock supply from time to time. Automatic mechanism does the rest.

In the claims that follow, to which I hereby refer, I set forth the novelty inherent in the structure and will illustrate and describe but a single example which will however, be sufficient for those skilled in the art to attain the novel structure in other modified embodiments and for analogous purposes.

In the drawings:

Figure 1 is a somewhat diagrammatic plan view of the mechanism arrangement illustrating my invention.

Figure 2 is a side elevation of the same, also diagrammatic.

Figure 3 is a detail section taken across the conveyor device to the right of the switch control element which stops the press operation.

Figure 8 is a perspective showing the stock supply control solenoid and mechanism.

Figure 9 is a perspective view illustrating the detail of the press operated switch and operative parts for the stock supply control.

Figure 10 is a detail of the supply table, and holding pawl and trip arm of the stock control mechanism.

Figure 11 is a wiring diagram of the device as shown.

Figure 4:
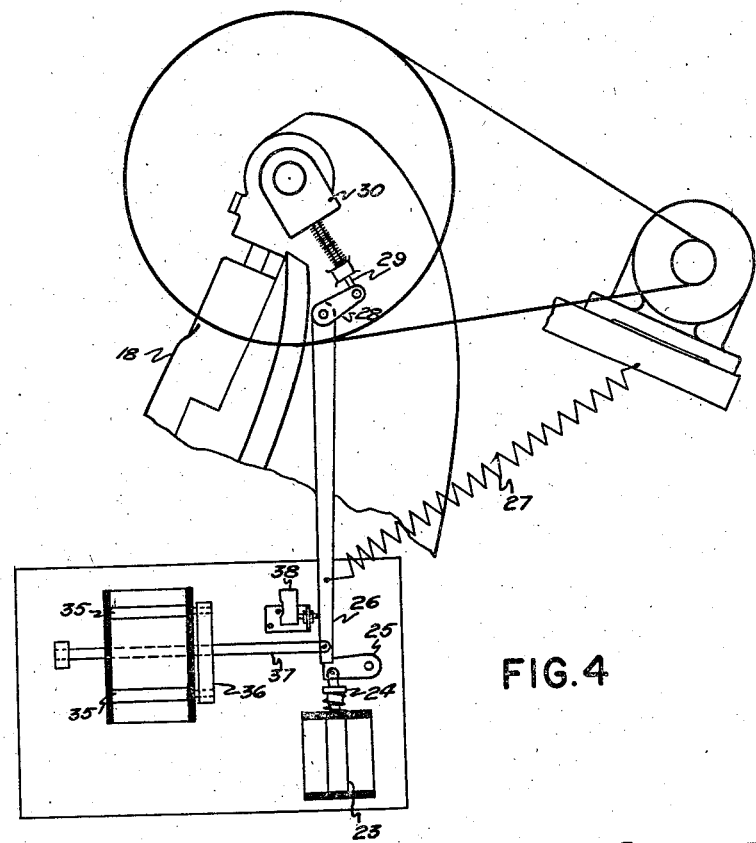
Figure 4 is a detail elevation showing the press clutch control.

Referring first to the diagrams, I indicate at P a press reciprocating part, and at C a commutator assembling point. The press in the particular form indicated in diagram cuts off the end of an advancing piece of strip stock, and then dies out the sides of that piece of stock, forming a commutator segment indicated at 8. (See plan view of press P in Fig. 1.) In the particular press pushers eject the finished segment.

A supply table for strip stock is shown at 1, this table will be tipped toward the press for gravity feed, and also slanted sidewise so that strip stock S, laid on the table will slide sidewise by gravity to a point where it can move lengthwise by gravity into the press. In the particular press a pusher adds to the gravity motion. Fingers 3 (referring still to the two diagrams) hold the strip stock so that until one strip is fed out another will not drop into feeding position. The spring plunger 5 on a press moving part contacts a switch 4 when there is no strip material intervening, i. e. when the press is about to use up a strip, and this switch energizes the finger 3, as will be described in more detail.

The segments as they leave the press one at a time pass by gravity down a chute 9 which delivers them to a conveyor belt 10. The conveyor belt delivers the segments to a channel in the delivery ejecting mechanism, the gravity wheel 13 assisting against slipping of the segments at the end of their path on the conveyor belt.

Along the conveyor (still referring to the diagram), are two segment controlled elements containing electrical contacts which ride the conveyor and are influenced by the segments passing under them. These are generally indicated at 11 and 12. The member 11 stops the press when the segments have accumulated sufficiently that they lie in contact with each other as far back as this member. The member 12 starts the press going when the segments beneath it have not accumulated sufficiently to be in juxtaposition. The delivery ejector is indicated diagrammatically by a plunger member 15 which moves to and fro forcing one segment at a time from the end of the delivery channel where it lies up against the back stop 15a. The segments are ejected and pushed into a commutator assembling device which I have indicated by a showing of a commutator at C.

As so arranged when the supply has built up completely back to device 11 the press stops. When the conveyor has fed the accumulation forward to the ejection point sufficiently to leave the space beneath the element 12 free of segments the press will start up again. Thus the operation of the ejector mechanism may be in cycles of a predetermined number of segments to fill a commutator, the commutator removed and a new one installed and at no time will there be any lack of supply nor will the operator have to stop the press to avoid over accumulation.

Referring now to the particular mechanisms illustrated in the diagram, I refer first to Fig. 4. In this figure the arm 26 connected to the link 28, and pivoted on the press, when moved to the left (as in Fig. 4), will cause the press clutch indicated at 30 to close. The press plunger 18 will then begin to reciprocate. The arm 26 is held normally in the position away from that illustrated in Fig. 4, by means of a spring 27, and when pulled over by that spring will open the clutch and cause the press to stop.

The arm is held in the position shown in Fig. 4 by means of a latch 25 operated by the plunger 24 of a solenoid 23. When the solenoid is operated the arm is released to stop the press.

At the same time that the arm is released it permits the switch 38 to close, said switch being held open when the arm is in latched position. This permits a circuit to be established in the solenoid 35, the core 36 of which is connected to the arm 26. The completing of a circuit to this solenoid by the device 12, will thus cause the core 36 to be pulled into the solenoid pulling the arm 26 to latched position and starting the press, and at the same time throwing off the switch 38.

Figures 5, 6:
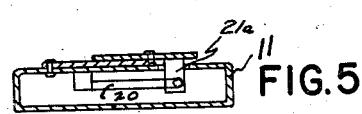
Figure 5 is a sectional plan view of the press stop control.
Figure 6 is a sectional plan view of the press start control.

Referring now to the device 11 and 12. The device 11, Figs. 5 and 6, is mounted on one of the cover plates 10b that overlie the conveyor belt 10, where it rests on the base 10a (Fig. 3). In Fig. 5 the numeral 11 is applied to the casing of the device. Within the casing is a contact switch composed of members 21 and 22. A tongue 21a projects into the casing from the lever assembly located in the wall of the casing overlying the slot between the two cover plates 10a over the conveyor.

Figure 7:
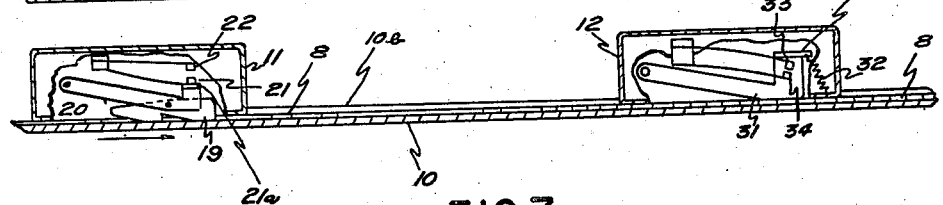
Figure 7 is a vertical section taken through the conveyor belt and both of these controls.

In Fig 7 the said wall has been cut away to illustrate the levers. There is first a segment contacting lever 19 pivoted to a second lever 20. This lever 20 to one side of its pivot to lever 19 has the tongue 21a thereon.

The segments are delivered one at a time along the conveyor belt 10 and act to raise the trailing end of the lever 19 as they pass under the lever. This rocks the lever 19 moving the lever 20 somewhat but not enough to close the switch contacts. The same thing happens when the segment passes under the advanced end of the lever 19 which is riding on the belt. But if there is a segment under the advanced end of lever 19 when another segment lifts the trailing end, the lever 19 in rocking to this last segment will lift up the lever 20 sufficiently to result in a contact between the switch elements 21 and 22. This results in closing a circuit to the solenoid 23, releasing the clutch control lever of the press and bringing the operations to a stop.

Turning next to the device 12. This is shown in Fig. 6 and Fig. 7. The casing arrangement is alike to device 11. In Fig. 6 the wall of the casing adjacent the slot between the conveyor covers has a single lever 31 thereon. This lever rides at its free end on the conveyor belt. It has a tongue 31a projecting into the casing 12 where a spring 32 is connected to hold the lever down on the belt. So long as the lever 31 is held up by means of segments accumulated on the belt and in juxtaposition, the contacts 33 and 34 of the switch within the casing cannot close. But if it occurs that no segment lies under the end of lever 31, the spring 32 pulls the lever down thus moving the contact 33 which lies under the tongue 31a so as to close contact. The result is to complete a circuit, which has been partially closed by the switch 38.

Referring finally to the supply to the press of strip, as noted in Figs. 8, 9 and 10, a portion of the table 2 is shown in Fig. 10, on which are placed strips of proper cross section. The table slants both endwise and sidewise, as already noted with the result that the bars move sidewise on the table to a position S—1, from which position they are permitted to slide into the die press. To prevent the strips from accumulating over the position S—1, there are two pawls 3, which lie inside the rim of the table on suitable pivots 41, and are impelled by springs 43 mounted on the pawls and engaging pins 44 on cross pieces 42 of the table, to a position of engaging the lowermost strip of a supply on the table preventing it from entering the delivery position. By rocking these pawls a single strip is released at a time.

The rocking is performed by means of striker arms 40 pivoted under the table and having tips which project through holes in the table beneath the aforementioned delivery position for strips. By rocking these striker arms the pawls are struck upward, to release a strip at a time. To rock the pawls a solenoid 39 is provided which engages a bell crank 45, mounted fast on the shaft 46 that carries both of the arms.

To energize the solenoid, mechanism is provided on the press, as already noted. This mechanism consists of the spring plunger carrier 5a, the plunger 5 of which moves up and down with the press head and strikes against the upper surface of a strip being fed to the cutting and forming dies. So long as there is a portion of strip material there the plunger cannot move down further and simply compresses its spring. But if there is no portion of strip located beneath the plunger, then it can contact the operating button of a snap small switch 4, thus closing circuit to the solenoid 39 pulling in the core thereof, rocking the arms 40 and tripping the pawls.

It will be evident from the above that the several mechanisms provided are in a sense subservient to the main idea which is to use the accumulation of pieces on the conveyor as a means of operating trips of one kind or another, so as to start and stop the press that supplies the parts thus keeping an ample supply on hand for use in the machine being supplied. I do not wish to be limited, for example, to the use of solenoids, and electrical operation but may instead use hydraulic lines and valves instead of switches.

None the less the nature of the members 11 and 12 have been adapted for control of presses making small parts and in their particulars they form part of my invention.

Referring to the wiring diagram, Fig. 10, it will be noted that the switch 33, 34 in device 12, is in series with the switch 38, which as marked is normally closed. The switch 38 connects to the solenoid 35 and thence back to the source of current. As a result, when switch 33, 34 is closed, switch 38 being normally closed, the circuit is closed to energize solenoid 35. This draws in its core 36 as indicated, to close press clutch, which it accomplishes by swinging over the arm 26. This opens switch 38, but by the time this takes place the latch 25 will have grasped and held the arm 26.

The press continues to operate until the device 11 comes into play. The switch 21, 22 is in series with the solenoid 23, which is connected back to the source of current. When the switch is closed the solenoid 23 pulls down its core, which releases the latch and permits the arm 26 to swing to clutch opening position. This also permits the switch 38 to assume its normally closed position, ready for the next operation to be instituted by the switch 33, 34.

The diagram also shows the snap switch 4 which is in series with the solenoid 34, which is connected back to the source of current, so that the solenoid 39 goes into operation upon the closing of switch 4.

Having thus described my invention, what I claim as new and desire to secure by Letters Patent is:

1. In combination with a press for supplying a succession of parts, a conveyor to move said parts and a machine to be supplied with the said parts, means lying over the path of the parts on the conveyor and actuated by the parts themselves, one means serving to energize mechanism adapted to stop the press and the other to energize a mechanism to start up the press, the means serving to stop the press being located nearest the press and the means serving to start up the press located nearest the machine to be supplied.

2. In combination with a press for supplying a succession of parts, a conveyor to move said parts and a machine to be supplied with the parts, means lying over the path of the parts on the conveyor and actuated by the parts themselves, one element of said means serving to energize mechanism adapted to stop the press and the other element of said means adapted to energize a mechanism to start up the press, said means serving to stop the press being arranged to come into operation when parts have accumulated on the belt beneath it into juxtaposition with each other, and the means serving to start the press being arranged to come into operation when there is no such accumulation of parts beneath it.

3. In combination with a press for supplying a succession of parts, a conveyor to move said parts and a machine to be supplied with the said parts, means lying over the path of the parts on the conveyor and actuated by the parts themselves, one means serving to energize mechanism adapted to stop the press and the other to energize a mechanism to start up the press, and means arranged with relation to the press to supply strip material to be cut and formed, said means being arranged to release strips of material to be formed one at a time, and means operated by the press and controlled by the presence or absence of a piece of strip material beneath it, to energize the operation of said releasing means.

4. In combination with a conveyor supplying parts in succession to a machine for use one at a time, a pair of controls arranged to be moved to positions of energizing press starting and stopping mechanism, said controls having as operating devices levers held in contact with the conveyor surface and arranging to be elevated therefrom by the parts on the conveyor as it moves them along, one of said controls having a lever system which a succession of pieces passing beneath it one at a time will not cause it to operate its control and the other of said controls having a lever system which the absence of an accumulation of pieces beneath it will cause it to operate its control.

5. A control member arranged to be operated by pieces of material on a conveyor belt, comprising a lever mounted pivotally so as to present two ends to the conveyor surface, in the path of the pieces of material moving with the conveyor belt, and a second lever to which the first is pivoted having a contact closing member thereon, the path required for said contact to engage another contact for closing an electric circuit being such that unless the one end of the first lever is already engaged by a piece of the material, the raising of the lever by a succeeding piece of material will not complete the said path.

WALTER C. WEBER.